(12) United States Patent
Müller et al.

(10) Patent No.: US 9,120,894 B2
(45) Date of Patent: Sep. 1, 2015

(54) METHOD FOR PRODUCING POLYETHER POLYOLS

(75) Inventors: Thomas Ernst Müller, Aachen (DE); Christoph Gürtler, Köln (DE); Matthias Wohak, Dormagen (DE); Jörg Hofmann, Krefeld (DE); Muhammad Afzal Subhani, Aachen (DE); Maurice Cosemans, Heinsberg (DE); Walter Leitner, Aachen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 14/131,977

(22) PCT Filed: Jul. 17, 2012

(86) PCT No.: PCT/EP2012/063980
§ 371 (c)(1),
(2), (4) Date: Feb. 24, 2014

(87) PCT Pub. No.: WO2013/011015
PCT Pub. Date: Jan. 24, 2013

(65) Prior Publication Data
US 2014/0155559 A1     Jun. 5, 2014

(30) Foreign Application Priority Data

Jul. 18, 2011   (EP) ..................... 11174412

(51) Int. Cl.
| C08G 85/00 | (2006.01) |
| C08G 65/00 | (2006.01) |
| C08G 65/26 | (2006.01) |
| C08G 64/34 | (2006.01) |

(52) U.S. Cl.
CPC ............ *C08G 65/2663* (2013.01); *C08G 64/34* (2013.01); *C08G 65/2603* (2013.01)

(58) Field of Classification Search
CPC ............... C08G 64/34; C08G 65/2603; C08G 65/2663; C08G 65/26
USPC ........................................... 526/64; 528/405
See application file for complete search history.

(56) References Cited

U.S. PATENT DOCUMENTS

| 3,404,109 | A | 10/1968 | Milgrom |
| 3,829,505 | A | 8/1974 | Herold |
| 3,941,849 | A | 3/1976 | Herold |
| 5,158,922 | A | 10/1992 | Hinney et al. |
| 5,470,813 | A | 11/1995 | Le-Khac |
| 5,689,012 | A * | 11/1997 | Pazos et al. ................... 568/619 |
| 6,780,813 | B1 | 8/2004 | Hofmann et al. |
| 7,008,900 | B1 | 3/2006 | Hofmann et al. |
| 2003/0050496 | A1 | 3/2003 | Reisinger et al. |
| 2003/0204042 | A1 | 10/2003 | Moethrath et al. |
| 2009/0292147 | A1 | 11/2009 | Ostrowski et al. |
| 2010/0048935 | A1 | 2/2010 | Mijolovic et al. |

FOREIGN PATENT DOCUMENTS

| DE | 101 47 712 A1 | 4/2003 |
| EP | 0 222 453 A2 | 5/1987 |
| EP | 0700949 A2 | 3/1996 |
| EP | 0743093 A1 | 11/1996 |
| EP | 0761708 A2 | 3/1997 |
| EP | 1359177 A1 | 11/2003 |
| JP | 4145123 B2 | 9/2008 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-03018526 A1 | 3/2003 |
| WO | WO-03/029325 A1 | 4/2003 |
| WO | WO-2007147780 A1 | 12/2007 |
| WO | WO-2008092767 A1 | 8/2008 |

OTHER PUBLICATIONS

International Search Report for PCT/EP2012063980 mailed Oct. 9, 2012.

* cited by examiner

*Primary Examiner* — T. Victor Oh
(74) *Attorney, Agent, or Firm* — Drinker Biddle & Reath LLP

(57) ABSTRACT

The present invention relates to a process for the preparation of polyether carbonate polyols from one or more H-functional starter compounds, one or more alkylene oxides and carbon dioxide in the presence of a double metal cyanide catalyst, wherein (α) the H-functional starter substance or a mixture of at least two H-functional starter substances is initially introduced into the reaction vessel, (β) for the activation, a part amount (based on the total amount of the amount of alkylene oxides employed in steps (β) and (γ)) of one or more alkylene oxides is added to the mixture resulting from step (α), it also being possible for step (β) to be carried out several times for the activation, (γ) one or more alkylene oxides and carbon dioxide are metered continuously into the mixture resulting from step (β) ("copolymerization"), the alkylene oxides employed for the copolymerization being identical to or different from the alkylene oxides employed in step (β), characterized in that in step (γ) the carbon dioxide is passed into the mixture by (i) gassing the reaction mixture in the reactor from the bottom, (ii) using a hollow shaft stirrer, (iii) a combination of the metering operations according to (i) and (ii), and/or (iv) gassing over the surface of the liquid by using stirrer units configured in several stages.

15 Claims, No Drawings

METHOD FOR PRODUCING POLYETHER POLYOLS

RELATED APPLICATIONS

This application is a national stage application (under 35 U.S.C. §371) of PCT/EP2012/063980, filed Jul. 17, 2012, which claims benefit of European Application No. 11174412.4, filed Jul. 18, 2011, which is incorporated by reference herein.

The present invention relates to a process for the activation of double metal cyanide (DMC) catalysts under a carbon dioxide atmosphere for the preparation of polyether carbonate polyols by catalytic copolymerization of carbon dioxide ($CO_2$) with alkylene oxides in the presence of one or more H-functional starter substances.

The preparation of polyether carbonate polyols by catalytic reaction of alkylene oxides (epoxides) and carbon dioxide in the presence of H-functional starter substances ("starters") has been investigated intensively for more than 40 years (e.g. Inoue et al., Copolymerization of Carbon Dioxide and Epoxide with Organometallic Compounds; Die Makromolekulare Chemie 130, 210-220, 1969). This reaction is shown in diagram form in equation (I), wherein R represents an organic radical, such as alkyl, alkylaryl or aryl, each of which can also contain hetero atoms, such as, for example, O, S, Si etc., and wherein e and f represent an integer, and wherein the product shown for the polyether carbonate polyol in equation (I) is merely to be understood as meaning that blocks with the structure shown can in principle be found in the polyether carbonate polyol obtained, but the sequence, number and length of the blocks and the OH functionality of the starter can vary and is not limited to the polyether carbonate polyol shown in equation (I). This reaction (see equation (I)) is ecologically very advantageous, since this reaction represents the conversion of a greenhouse gas, such as $CO_2$, into a polymer. The cyclic carbonate (for example for $R=CH_3$ propylene carbonate) shown in equation (I) is formed as a further product, actually a by-product.

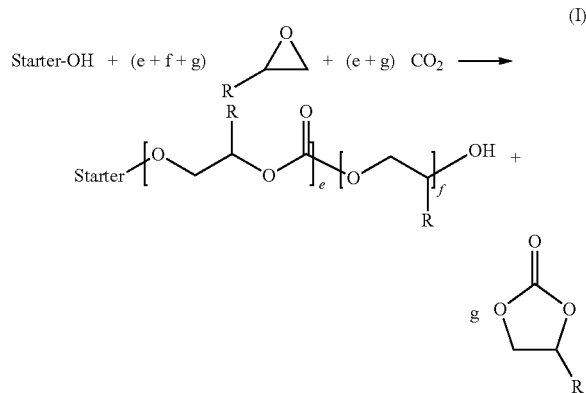

A step in which a part amount of alkylene oxide compound, optionally in the presence of $CO_2$, and/or an H-functional starter compound, is added to the DMC catalyst and the addition of the alkylene oxide compound is then interrupted, due to a subsequent exothermic chemical reaction an evolution of heat which can lead to a temperature peak ("hot spot"), and due to the reaction of alkylene oxide and optionally $CO_2$ a drop in pressure in the reactor being observed, is called activation in the context of this invention. The addition of the part amount of the alkylene oxide compound can optionally be carried out in several individual steps, as a rule the occurrence of the evolution of heat being awaited in each step. The process step of activation includes the time span from the start of the addition of the part amount of alkylene oxide compound, optionally in the presence of $CO_2$, to the DMC catalyst up to the occurrence of the evolution of heat. If the part amount of the alkylene oxide compound is added in several individual steps, the process step of activation includes all the time spans during which the part amounts of the alkylene oxide compound have been added stepwise until the occurrence of the evolution of heat each time. In general, the activation step can be preceded by a step for drying the DMC catalyst and, where appropriate, the H-functional starter at elevated temperature and/or under reduced pressure, where appropriate while passing an inert gas through the reaction mixture EP-A 0 222 453 discloses a process for the preparation of polycarbonates from alkylene oxides and carbon dioxide using a catalyst system of DMC catalyst and a co-catalyst, such as zinc sulfate. In this process, the polymerization is initiated by bringing uniquely a part of the alkylene oxide into contact with the catalyst system. Only thereafter are the remaining amount of alkylene oxide and the carbon dioxide metered in simultaneously. The amount of 60 wt. % of alkylene oxide compound stated in EP-A 0 222 453 for the activation step in Examples 1 to 7 relative to the H-functional starter compound is high and has the disadvantage that this represents a certain safety risk for large-scale industrial uses because of the high exothermicity of the homopolymerization of alkylene oxide compounds.

WO-A 2003/029325 discloses a process for the preparation of high molecular weight aliphatic polyether carbonate polyols (weight-average molecular weight greater than 30,000 g/mol), in which a catalyst from the group consisting of zinc carboxylate and multimetal cyanide compound which is anhydrous is employed and is first brought into contact with at least a part amount of the carbon dioxide, before the alkylene oxide is added. $CO_2$ final pressures of up to 150 bar impose very high requirements on the reactor and on safety. Even by the extremely high pressure of 150 bar, only approx. 33 wt. % of $CO_2$ to a maximum of 42 wt. % of $CO_2$ was incorporated. The examples presented describe the use of a solvent (toluene), which must be separated off again by means of heat after the reaction, which leads to an increased time and cost outlay. Furthermore, the polymers, with an inhomogeneity or polydispersity of 2.7 or more, have a very broad molecular weight distribution.

It was therefore the object of the present invention to provide a process for the preparation of polyether carbonate polyols which leads to a high content of $CO_2$ incorporated into the polymer. In a preferred embodiment of the invention, a favourable selectivity (i.e. low ratio of cyclic carbonate to polyether carbonate polyol) of the resulting polyether carbonate polyol is also to be effected at the same time.

It has been found, surprisingly, that the object according to the invention is achieved by a process for the preparation of polyether carbonate polyols from one or more H-functional starter compounds, one or more alkylene oxides and carbon dioxide in the presence of a DMC catalyst, wherein (α) the H-functional starter substance or a mixture of at least two H-functional starter substances is initially introduced into the reaction vessel and, where appropriate, water and/or other readily volatile compounds are removed by elevated temperature and/or reduced pressure ("drying"), the DMC catalyst being added to the H-functional starter substance or the mixture of at least two H-functional starter substances before or after the drying, (β) for the activation, a part amount (based on the total amount of the amount of alkylene oxides employed in steps (β) and (γ)) of one or more alkylene oxides is added to the mixture resulting from step (α), it being possible for this addition of a part amount of alkylene oxide optionally to be carried out in the presence of $CO_2$ and/or an inert gas (such as, for example, nitrogen or argon), and it also being possible for step (β) to be carried out several times for the activation, (γ) one or more alkylene oxides and carbon dioxide are metered continuously into the mixture resulting from step (β) ("copolymerization"), the alkylene oxides employed for the copolymerization being identical to or different from the alkylene oxides employed in step (β), characterized in that in step (γ) the carbon dioxide is passed into the mixture by
- (i) gassing the reaction mixture in the reactor from the bottom,
- (ii) using a hollow shaft stirrer,
- (iii) a combination of the metering operations according to (i) and (ii), and/or
- (iv) gassing over the surface of the liquid by using stirrer units configured in several stages.

The object of a preferred embodiment of the invention of the present invention was to provide a process for the preparation of polyether carbonate polyols which leads to a high content of $CO_2$ incorporated into the polymer and at the same time also has the effect of a favourable selectivity (i.e. low ratio of cyclic carbonate to polyether carbonate polyol) of the resulting polyether carbonate polyol. It has been found, surprisingly, that the object of this preferred embodiment is achieved by the process described above for the preparation of polyether carbonate polyols from one or more H-functional starter compounds, one or more alkylene oxides and carbon dioxide in the presence of a DMC catalyst, characterized in that in step (β) the addition of the part amount of one or more alkylene oxides is carried out under an atmosphere of an inert gas/carbon dioxide mixture (for example nitrogen/carbon dioxide mixture or argon/carbon dioxide mixture) or under a carbon dioxide atmosphere, preferably at temperatures of from 50 to 200° C., preferably from 80 to 160° C., particularly preferably from 125 to 135° C.

In a preferred embodiment, the amount of one or more alkylene oxides employed in the activation in step (β) is 0.1 to 25.0 wt. %, preferably 1.0 to 20.0 wt. %, particularly preferably 2.0 to 16.0 wt. % (based on the amount of starter compound employed in step (α)). The alkylene oxide can be added in one step or stepwise in several part amounts. The DMC catalyst is preferably employed in an amount such that the content of DMC catalyst in the resulting polyether carbonate polyol is 10 to 10,000 ppm, particularly preferably 20 to 5,000 ppm and most preferably 50 to 500 ppm.

Step (α):

The addition of the individual components in step (α) can be carried out simultaneously or successively in any desired sequence; preferably, DMC catalyst is first initially introduced into the reaction vessel in step (α) and the H-functional starter compound is added simultaneously or subsequently.

A preferred embodiment provides a process wherein in step (α)
- (α1) the DMC catalyst and one or more H-functional starter compounds are initially introduced into a reactor,
- (α2) an inert gas (for example nitrogen or a noble gas, such as argon), an inert gas/carbon dioxide mixture or carbon dioxide is passed through the reactor at a temperature of from 50 to 200° C., preferably from 80 to 160° C., particularly preferably from 125 to 135° C., and a reduced pressure (absolute) of from 10 mbar to 800 mbar, preferably from 40 mbar to 200 mbar, is simultaneously established in the reactor ("drying") by removal of the inert gas or carbon dioxide (for example with a pump).

A further preferred embodiment provides a process wherein in step (α)
- (α1) the H-functional starter compound or a mixture of at least two H-functional starter compounds is initially introduced into the reaction vessel, optionally under an inert gas atmosphere (for example nitrogen or argon), under an atmosphere of an inert gas/carbon dioxide mixture or under a pure carbon dioxide atmosphere, particularly preferably under an inert gas atmosphere (for example nitrogen or argon), and
- (α2) an inert gas (for example nitrogen or a noble gas, such as argon), an inert gas/carbon dioxide mixture or carbon dioxide, particularly preferably an inert gas (for example nitrogen or argon), is passed into the resulting mixture of DMC catalyst and one or more H-functional starter compounds at a temperature of from 50 to 200° C., preferably from 80 to 160° C., particularly preferably from 125 to 135° C., and a reduced pressure (absolute) of from 10 mbar to 800 mbar, preferably from 40 mbar to 200 mbar, is simultaneously established in the reactor by removal of the inert gas or carbon dioxide (for example with a pump), the double metal cyanide catalyst being added to the H-functional starter substance or the mixture of at least two H-functional starter substances in step (α1) or immediately subsequently in step (α2).

The DMC catalyst can be added in the solid form or as a suspension in an H-functional starter compound. If the DMC catalyst is added as a suspension, this is preferably added to the one or more H-functional starter compounds in step (α1).

Step (β):

The activation step (step(β)) can be carried out in the presence of $CO_2$ and/or an inert gas (such as, for example, nitrogen or argon). Preferably, step(β) is carried out under an atmosphere of an inert gas/carbon dioxide mixture (for example nitrogen/carbon dioxide mixture or argon/carbon dioxide mixture) or a carbon dioxide atmosphere, particularly preferably under a carbon dioxide atmosphere. The establishing of an atmosphere of an inert gas/carbon dioxide mixture (for example nitrogen/carbon dioxide mixture or argon/carbon dioxide mixture) or a carbon dioxide atmosphere and the metering of one or more alkylene oxides can in principle be carried out in various ways. The prepressure is preferably established by passing in carbon dioxide, the pressure (absolute) being 10 mbar to 100 bar, preferably 100 mbar to 50 bar and preferably 500 mbar to 50 bar. The start of the metering of the alkylene oxide can take place from the vacuum or under a previously selected prepressure. In step (β), preferably, a range of from 10 mbar to 100 bar, preferably 100 mbar to 50 bar and preferably 500 mbar to 50 bar is established as the overall pressure (absolute) of the atmosphere of an inert gas/carbon dioxide mixture (for example nitrogen/carbon dioxide mixture or argon/carbon dioxide mixture) or of a carbon dioxide atmosphere and optionally alkylene oxide. During or after the metering of the alkylene oxide, the pressure is adjusted, where appropriate, by passing in further carbon dioxide, the pressure (absolute) being 10 mbar to 100 bar, preferably 100 mbar to 50 bar and preferably 500 mbar to 50 bar.

Step (γ):

The metering of one or more alkylene oxides and of the carbon dioxide can be carried out simultaneously, alternately or sequentially, it being possible for the total amount of carbon dioxide to be added all at once or by metering over the reaction time. It is possible to increase or to lower, gradually or stepwise, or to leave constant the $CO_2$ pressure during the addition of the alkylene oxide. Preferably, the overall pressure is kept constant during the reaction by topping up with carbon dioxide. The metering of one or more alkylene oxides or the $CO_2$ is carried out simultaneously with or alternately or sequentially to the carbon dioxide metering. It is possible to meter the alkylene oxide with a constant metering rate or to increase or to lower the metering rate gradually or stepwise or to add the alkylene oxide in portions. Preferably, the alkylene oxide is added to the reaction mixture with a constant metering rate. If several alkylene oxides are employed for the synthesis of the polyether carbonate polyols, the alkylene oxides can be metered in individually or as a mixture. The metering of the alkylene oxides can be carried out simultaneously, alternately or sequentially via in each case separate metering operations (additions), or via one or more metering operations, it being possible for the alkylene oxides to be metered in individually or as a mixture. Via the nature and/or the sequence of the metering of the alkylene oxides and/or of the carbon dioxide, it is possible to synthesize random, alternating, block-like or gradient-like polyether carbonate polyols.

Preferably, an excess of carbon dioxide, based on the calculated amount of carbon dioxide incorporated in the polyether carbonate polyol, is employed, since due to the slowness of carbon dioxide to react an excess of carbon dioxide is advantageous. The amount of carbon dioxide can be determined via the overall pressure under the particular reaction conditions. The range of from 0.01 to 120 bar, preferably 0.1 to 110 bar, particularly preferably from 1 to 100 bar has proved to be advantageous as the overall pressure (absolute) for the copolymerization for the preparation of the polyether carbonate polyols. It is possible to feed in the carbon dioxide continuously or discontinuously. This depends on how rapidly the alkylene oxides and the $CO_2$ are consumed, and on whether the product is optionally to contain $CO_2$-free polyether blocks or blocks with a varying $CO_2$ content. The amount of carbon dioxide (stated as the pressure) can equally be varied during the addition of the alkylene oxides. Depending on the reaction conditions chosen, it is possible to pass the $CO_2$ into the reactor in the gaseous, liquid or supercritical state. $CO_2$ can also be added to the reactor as a solid and can then pass into the gaseous, dissolved, liquid and/or supercritical state under the reaction conditions chosen.

It has furthermore been found for the process according to the invention that the copolymerization (step (γ)) for the preparation of the polyether carbonate polyols is advantageously carried out at 50 to 150° C., preferably at 60 to 145° C., particularly preferably at 70 to 140° C. and very particularly preferably at 90 to 130° C. Below 50° C., the reaction proceeds only very slowly. At temperatures above 150° C. the amount of undesirable by-products increases greatly.

In step (γ) and optionally also in step (n), the carbon dioxide is passed into the mixture by (i) gassing the reaction mixture in the reactor from the bottom (for example via an inlet tube or a gassing ring (distributor ring) with guiding of the gas below the stirrer blade) and, depending on the gas loading, optionally in combination with a gas distribution stirrer (for example a disc stirrer, paddle stirrer, Rushton turbine (for example Lightnin R-100®, Ekato PHASE-JET®, Smith Turbine® from Philadelphia Mixing Solutions, Chemineer BT-6® or CD-6® stirrer blade) further stirrer units (of any desired type, e.g. depending on the slenderness ratio (=reactor height/reactor diameter) H/D of the reactor, in the range of 1.0-10.0, preferably in the range of 1.5-7.0, axially conveying turbines, stirrer units which assist the heat transfer to internal cooling surfaces and/or promote mass transfer via the liquid surface) optionally being arranged on the stirrer shaft; a combination of two or more stirrer units has the technical advantage that the mass transfer of the gas into the liquid phase at the surface of the reaction mixture can be improved;

(ii) using a hollow shaft stirrer (i.e. by means of the jet suction principle), for example as a tubular stirrer, angled blade turbine with hollow blades, Ekato GAS-JET®, PREMEX laboratory gassing stirrer of the "br" series, laboratory gassing stirrer from Parr Instruments; the use of a hollow shaft stirrer has the effect that the gas phase accumulating in the gas space is sucked in via a hollow shaft and introduced again into the reaction mixture from the bottom;

(iii) a combination of the metering operations according to (i) and (ii), which is advantageous for operation at a constant level of fill in the reactor; for example, the combination of the metering operations according to (i) and (ii) can be effected by combining a gassing of the reaction mixture in the reactor from the bottom according to one of the possibilities mentioned under (i) with a hollow shaft stirrer according to (ii) (such as, for example, a gas distribution stirrer with a jet suction unit arranged above this as a second dispersing stage), preferably in a manner such that the gas is passed in from the bottom below the hollow shaft stirrer; and/or (iv) gassing via the surface of the liquid by using appropriate stirrer units typically of multi-stage configuration (such as e.g. MIG or Ekato MIG/INTERMIG®) or by means of stirrer units acting on the surface of the liquid (e.g. grid stirrers).

The configuration of the stirring conditions is to be determined by the person skilled in the art from case to case according to the state of the art of stirring depending on the reactions conditions (e.g. viscosity of the liquid phase, gas loading, surface tension), in order e.g. to reliably avoid overflowing of a stirrer unit gassed from the bottom or to ensure the desired introduction of energy and/or mass transfer in the gassing state. The reactor optionally contains installed components, such as, for example, baffles and/or cooling surfaces (configured as a tube, coil, plates or in a similar form), gassing ring and/or inlet tube. Further heat exchanger surfaces can be arranged in a pumped circulation, the reaction mixture then being conveyed via suitable pumps (e.g. screw pump, centrifugal or gear pump). The circulating stream here can also be fed back into the reactor e.g. via an injector nozzle, as a result of which a part of the gas space is sucked in and mixed intensively with the liquid phase for the purpose of improving the mass transfer.

The gassing of the reaction mixture in the reactor according to (i) is preferably carried out via a gassing ring, a gassing nozzle or via a gas inlet tube. The gassing ring is preferably an annular arrangement or two or more annular arrangements of gassing nozzles, which are preferably arranged on the base of the reactor and/or on the side wall of the reactor.

The hollow shaft stirrer is preferably a stirrer in which the gas is passed into the reaction mixture via a hollow shaft of the stirrer. By rotation of the stirrer in the reaction mixture (i.e. during mixing), a reduced pressure develops at the end of the stirrer blade connected to the hollow shaft, such that the gas phase (containing $CO_2$ and possibly alkylene oxide which has not been consumed) is sucked out of the gas space above the reaction mixture and passed into the reaction mixture via the hollow shaft of the stirrer.

The gassing of the reaction mixture according to (i), (ii), (iii) or (iv) can in each case be carried out with freshly metered-in carbon dioxide (and/or combined with suction of the gas out of the gas space above the reaction mixture and subsequent recompression of the gas). For example, the gas which has been sucked out of the gas space above the reaction mixture and compressed, optionally mixed with fresh carbon dioxide and/or alkylene oxide, is passed into the reaction mixture according to (i), (ii), (iii) and/or (iv). Preferably, the drop in pressure which arises via incorporation of the carbon dioxide and the alkylene oxide into the reaction product during the copolymerization is compensated via freshly metered-in carbon dioxide.

The alkylene oxide can be passed into the liquid phase separately or together with the $CO_2$, both via the surface of the liquid or directly. Preferably, the alkylene oxide is passed directly into the liquid phase, since this has the advantage that the alkylene oxide introduced is rapidly mixed with the liquid phase and local concentration peaks of alkylene oxide are avoided in this way. The introduction into the liquid phase can be carried out via one or more inlet tubes, one or more nozzles or one or more annular arrangements of multiple metering points, which are preferably arranged on the base of the reactor and/or on the side wall of the reactor.

The three steps $\alpha$, $\beta$ and $\gamma$ can be carried out in the same reactor or in each case separately in different reactors. Particularly preferred reactor types are stirred tank, tube reactor and loop reactor. If reactions steps $\alpha$, $\beta$ and $\gamma$ are carried out in different reactors, a different reactor type can be used for each step.

Polyether carbonate polyols can be prepared in a stirred tank, the stirred tank being cooled via the reactor jacket, internal cooling surfaces and/or cooling surfaces in a pumped circulation, depending on the embodiment and mode of operation. Both in the semi-batch use, in which the product is removed only after the end of the reaction, and in the continuous use, in which the product is removed continuously, attention is to be paid in particular to the metering rate of the alkylene oxide. It is to be adjusted such that in spite of the inhibiting action of the carbon dioxide, the alkylene oxides react sufficiently rapidly. The concentration of free alkylene oxides in the reaction mixture during the activation step (step ($\beta$) is preferably >0 to 100 wt. %, particularly preferably >0 to 50 wt. %, most preferably >0 to 20 wt. % (in each case based on the weight of the reaction mixture). The concentration of free alkylene oxides in the reaction mixture during the reaction (step $\gamma$) is preferably >0 to 40 wt. %, particularly preferably >0 to 25 wt. %, most preferably >0 to 15 wt. % (in each case based on the weight of the reaction mixture).

A further possible embodiment in the stirred tank (batch) for the copolymerization (step $\gamma$) is characterized in that one or more H-functional starter compounds are metered continuously into the reactor during the reaction. If the process is carried out in semi-batch operation, the amount of H-functional starter compounds which are metered continuously into the reactor during the reaction is preferably at least 20 equivalent mol %, particularly preferably 70 to 95 equivalent mol % (in each case based on the total amount of H-functional starter compounds). If the process is carried out continuously, the amount of H-functional starter compounds which are metered continuously into the reactor during the reaction is preferably at least 80 equivalent mol %, particularly preferably 95 to 105 equivalent mol % (in each case based on the total amount of H-functional starter compounds).

In a preferred embodiment, the catalyst/starter mixture activated according to steps $\alpha$ and $\beta$ are reacted further with alkylene oxides and carbon dioxide in the same reactor. In a further preferred embodiment, the catalyst/starter mixture activated according to steps $\alpha$ and $\beta$ is reacted further with alkylene oxides and carbon dioxide in a different reaction container (for example a stirred tank, tube reactor or loop reactor). In a further preferred embodiment, the catalyst/starter mixture dried according to step $\alpha$ is reacted with alkylene oxides and carbon dioxide according to steps $\beta$ and $\gamma$ in a different reaction container (for example a stirred tank, tube reactor or loop reactor).

If the reaction is carried out in a tube reactor, the catalyst/starter mixture dried according to step $\alpha$ or the catalyst/starter mixture activated according to steps $\alpha$ and $\beta$ and where appropriate further starter as well as alkylene oxides and carbon dioxide are pumped continuously through a tube. If a catalyst/starter mixture dried according to step $\alpha$ is used, the activation according to step $\beta$ is carried out in the first part of the tube reactor and the copolymerization according to step $\beta$ is carried out in the second part of the tube reactor. The molar ratios of the reaction partners vary according to the desired polymer. In a preferred embodiment, carbon dioxide is metered in here in its liquid or supercritical form, in order to render possible an optimum miscibility of the components. The carbon dioxide can be introduced into the reactor at the entry of the reactor and/or via metering points arranged along the reactor. A part amount of the epoxide can be introduced at the entry of the reactor. The remaining amount of the epoxide is preferably introduced into the reactor via several metering points arranged along the reactor. For better thorough mixing of the reaction partners, mixing elements such as are marketed, for example, by Ehrfeld Mikrotechnik BTS GmbH, or mixer-heat exchanger elements which simultaneously improve the mixing and removal of heat are advantageously installed. Preferably, metered-in $CO_2$ and/or alkylene oxide is mixed with the reaction mixture by the mixing elements. In an alternative embodiment, various volume elements of the reaction mixture are mixed with one another.

Loop reactors can equally be used for the preparation of polyether carbonate polyols. These include in general reactors with internal and/or external recycling of substances (optionally with heat exchanger surfaces arranged in the circulation), such as, for example, a stream loop reactor, jet loop reactor or Venturi loop reactor, which can also be operated continuously, or a tube reactor configured in loop form with suitable devices for circulating the reaction mixture or a loop of several tube reactors connected in series or several stirred tanks connected in series.

In order to realize complete conversion, downstream of the reaction apparatus in which step $\gamma$ is carried out a further tank or a tube ("dwell tube") is often connected, in which residual concentrations of free alkylene oxides present after the reaction react. Preferably, the pressure in this downstream reactor is at the same pressure as in the reaction apparatus in which reaction step $\gamma$ is carried out. However, the pressure chosen in the downstream reactor can also be higher or lower. In a further preferred embodiment, after reaction step $\gamma$ all or some of the carbon dioxide is let down and the downstream reactor is operated under normal pressure or a slight increased pressure. The temperature in the downstream reactor is preferably 10 to 150° C., and preferably 20 to 100° C. At the end of the downstream reactor, the reaction mixture preferably contains less than 0.05 wt. % of alkylene oxide.

The polyether carbonate polyols obtained according to the invention preferably have an OH functionality (i.e. average number of OH groups per molecule) of at least 0.8, preferably of from 1 to 8, particularly preferably from 1 to 6 and very particularly preferably from 2 to 4. The molecular weight is at least 400, preferably 400 to 1,000,000 g/mol and particularly preferably 500 to 60,000 g/mol.

Generally, alkylene oxides (epoxides) having 2-45 carbon atoms can be employed for the process according to the invention. The alkylene oxides having 2-45 carbon atoms are, for example, one or more compounds chosen from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, such as, for example, methyl glycidyl ether, ethyl glycidyl ether, 2-ethylhexyl glycidyl ether, allyl glycidyl ether, glycidyl methacrylate and epoxide-functional alkyloxysilanes, such as, for example, 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane and 3-glycidyloxypropyltriisopropoxysilane. Preferably, ethylene oxide and/or propylene oxide, in particular propylene oxide, are employed as alkylene oxides.

Compounds with H atoms which are active for the alkoxylation can be employed as a suitable H-functional starter compounds. Groups which have active H atoms and are active for the alkoxylation are, for example, —OH, —NH$_2$ (primary amines), —NH— (secondary amines), —SH, and —CO$_2$H, and —OH and —NH$_2$ are preferred and —OH is particularly preferred. The H-functional starter substance employed is, for example, one or more compounds chosen from the group consisting of mono- or polyfunctional alcohols, polyfunctional amines, polyfunctional thiols, amino alcohols thioalcohols, hydroxy esters, polyether polyols, polyester polyols, polyester ether polyols, polyether carbonate polyols, polycarbonate polyols, polycarbonates, polyethyleneimines, polyether-amines (e.g. so-called Jeffamine® from Huntsman, such as e.g. D-230, D-400, D-2000, T-403, T-3000, T-5000 or corresponding products of BASF, such as e.g. Polyetheramin D230, D400, D200, T403, T5000), polytetrahydrofurans (e.g. PolyTHF® of BASF, such as e.g. PolyTHF® 250, 650S, 1000, 1000S, 1400, 1800, 2000), polytetrahydrofuranamines (BASF product Polytetrahydrofuranamin 1700), polyether thiols, polyacrylate polyols, castor oil, the mono- or diglyceride of ricinoleic acid, monoglycerides of fatty acids, chemically modified mono-, di and/or triglycerides of fatty acids, and $C_1$-$C_{24}$-alkyl fatty acid esters which contain on average at least 2OH groups per molecule. By way of example, the $C_1$-$C_{24}$-alkyl fatty acid esters which contain on average at least 2OH groups per molecule are commercial products such as Lupranol Balance® (BASF AG), Merginol® types (Hobum Oleochemicals GmbH), Sovermol® types (Cognis Deutschland GmbH & Co. KG) and Soyol® TM types (USSC Co.).

Monofunctional starter compounds which can be employed are alcohols, amines, thiols and carboxylic acids. Monofunctional alcohols which can be used are: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Possible monofunctional amines are: butylamine, tert-butylamine, pentylamine, hexylamine, aniline, aziridine, pyrrolidine, piperidine, morpholine. Monofunctional thiols which can be used are: ethanethiol, 1-propanethiol, 2-propanethiol, 1-butanethiol, 3-methyl-1-butanethiol, 2-butene-1-thiol, thiophenol. Monofunctional carboxylic acids which may be mentioned are: formic acid, acetic acid, propionic acid, butyric acid, fatty acids, such as stearic acid, palmitic acid, oleic acid, linoleic acid, linolenic acid, benzoic acid, acrylic acid.

Polyfunctional alcohols which are suitable as H-functional starter substances are, for example, difunctional alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol, 1,8-octanediol, 1,10-decanediol, 1,12-dodecanediol, bis-(hydroxymethyl)-cyclohexanes (such as, for example, 1,4-bis-(hydroxymethyl) cyclohexane), triethylene glycol, tetraethylene glycol, polyethylene glycols, dipropylene glycol, tripropylene glycol, polypropylene glycols, dibutylene glycol and polybutylene glycols); trifunctional alcohols (such as, for example, trimethylolpropane, glycerol, trishydroxyethyl isocyanurate, castor oil); tetrafunctional alcohols (such as, for example, pentaerythritol); polyalcohols (such as, for example, sorbitol, hexitol, sucrose, starch, starch hydrolysates, cellulose, cellulose hydrolysates, hydroxy-functionalized fats and oils, in particular castor oil), and all modification products of these abovementioned alcohols with various amounts of ε-caprolactone.

The H-functional starter substances can also be chosen from the substance class of polyether polyols, in particular those with a molecular weight $M_n$ in the range of from 100 to 4,000 g/mol. Polyether polyols which are built up from recurring ethylene oxide and propylene oxide units are preferred, preferably with a content of from 35 to 100% of propylene oxide units, particularly preferably with a content of from 50 to 100% of propylene oxide units. These can be random copolymers, gradient copolymers or alternating or block copolymers of ethylene oxide and propylene oxide. Suitable polyether polyols built up from recurring propylene oxide and/or ethylene oxide units are, for example, the Desmophen®, Acclaim®, Arcol®, Baycoll®, Bayfill®, Bayflex®, Baygal®, PET® and polyether polyols of Bayer MaterialScience AG (such as e.g. Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® 1010, PET® 1004, Polyether® S180). Further suitable homo-polyethylene oxides are, for example, the Pluriol® E brands of BASF SE, suitable homo-propylene oxides are, for example, the Pluriol® P brands of BASF SE, and suitable mixed copolymers of ethylene oxide and propylene oxide are, for example, the Pluronic® PE or Pluriol® RPE brands of BASF SE.

The H-functional starter substances can also be chosen from the substance class of polyester polyols, in particular those with a molecular weight $M_n$ in the range of from 200 to 4,500 g/mol. At least difunctional polyesters are employed as polyester polyols. Polyester polyols preferably comprise alternating acid and alcohol units. Acid components which are employed are e.g. succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixture of the acids and/or anhydrides mentioned. Alcohol components which are used are e.g. ethanediol, 1,2-propanediol, 1,3-propanediol, 1,4-butanediol, 1,5-pentanediol, neopentyl glycol, 1,6-hexanediol, 1,4-bis-(hydroxymethyl)-cyclohexane, diethylene glycol, dipropylene glycol trimethylolpropane, glycerol, pentaerythritol or mixtures of the alcohols mentioned. If difunctional or polyfunctional polyether polyols are employed as the alcohol component, polyester ether polyols, which can likewise serve as starter substances for the preparation of the polyether carbonate polyols, are obtained. Preferably, polyether polyols with $M_n$=150 to 2,000 g/mol are employed for the preparation of the polyester-ether polyols.

Polycarbonate diols can furthermore be employed as H-functional starter substances, in particular those with a molecular weight $M_n$ in the range of from 150 to 4,500 g/mol, preferably 500 to 2,500, which are prepared, for example, by reaction of phosgene, dimethyl carbonate, diethyl carbonate or diphenyl carbonate and difunctional alcohols or polyester polyols or polyether polyols. Examples of polycarbonates are to be found e.g. in EP-A 1359177. For example, the Desmophen® C types of Bayer MaterialScience AG, such as e.g. Desmophen® C 1100 or Desmophen® C 2200, can be used as polycarbonate diols.

In a further embodiment of the invention, polyether carbonate polyols can be employed as H-functional starter substances. In particular, polyether carbonate polyols which are obtainable by the process according to the invention described here are employed. These polyether carbonate polyols employed as H-functional starter substances are prepared beforehand for this in a separate reaction step.

The H-functional starter substances in general have an OH functionality (i.e. number of H atoms per molecule which are active for the polymerization) of from 1 to 8, preferably from 2 to 6 and particularly preferably from 2 to 4. The H-functional starter substances are employed either individually or as a mixture of at least two H-functional starter substances.

Preferred H-functional starter substances are alcohols of the general formula (II) wherein x is a number from 1 to 20, preferably an even number from 2 to 20. Examples of alcohols according to formula (II) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols according to formula (II) with ε-caprolactone, e.g. reaction products of trimethylolpropane with ε-caprolactone, reaction products of glycerol with ε-caprolactone and reaction products of pentaerythritol with ε-caprolactone. H-functional starter compounds which are furthermore preferably employed are water, diethylene glycol, dipropylene glycol, castor oil, sorbitol and polyether polyols built up from recurring polyalkylene oxide units.

The H-functional starter substances are particularly preferably one or more compounds chosen from the group consisting of ethylene glycol, propylene glycol, 1,3-propanediol, 1,3-butanediol, 1,4-butanediol, 1,5-pentanediol, 2-methyl-propane-1,3-diol, neopentyl glycol, 1,6-hexanediol, diethylene glycol, dipropylene glycol, glycerol, trimethylolpropane, di- and trifunctional polyether polyols, wherein the polyether polyol is built up from a di- or tri-H-functional starter compound and propylene oxide or a di- or tri-H-functional starter compound, propylene oxide and ethylene oxide. The polyether polyols preferably have an OH functionality of from 2 to 4 and molecular weight $M_n$ in the range of from 62 to 4,500 g/mol, and in particular a molecular weight $M_n$ in the range of from 62 to 3,000 g/mol.

The preparation of the polyether carbonate polyols is carried out by catalytic addition of carbon dioxide and alkylene oxides on to H-functional starter substances. In the context of the invention, "H-functional" is understood as meaning the number of H atoms per molecule of the starter compound which are active for the alkoxylation.

DMC catalysts for use in the homopolymerization of alkylene oxides are known in principle from the prior art (see e.g. U.S. Pat. No. 3,404,109, U.S. Pat. No. 3,829,505, U.S. Pat. No. 3,941,849 and U.S. Pat. No. 5,158,922). DMC catalysts which are described e.g. in U.S. Pat. No. 5,470,813, EP-A 700 949, EP-A 743 093, EP-A 761 708, WO 97/40086, WO 98/16310 and WO 00/47649 have a very high activity and render possible the preparation of polyether carbonate polyols at very low catalyst concentrations. The highly active DMC catalysts described in EP-A 700 949, which, in addition to a double metal cyanide compound (e.g. zinc hexacyanocobaltate(III)) and an organic complexing ligand (e.g. tert-butanol), also contain a polyether with a number-average molecular weight of greater than 500 g/mol, are a typical example.

The DMC catalysts according to the invention are preferably obtained by a procedure in which
(a) in the first step an aqueous solution of a metal salt is reacted with the aqueous solution of a metal cyanide salt in the presence of one or more organic complexing ligands, e.g. of an ether or alcohol,
(b) wherein in the second step the solid is separated off by known techniques (such as centrifugation or filtration) from the suspension obtained from (i),
(c) wherein, if appropriate, in a third step the solid which has been isolated is washed with an aqueous solution of an organic complexing ligand (e.g. by resuspending and subsequent renewed isolation by filtration or centrifugation),
(d) wherein the solid obtained, if appropriate after pulverization, is subsequently dried at temperatures of in general 20-120° C. and under pressures of from in general 0.1 mbar to normal pressure (1013 mbar), and wherein in the first step or immediately after the precipitation of the double metal cyanide compound (second step), one or more organic complexing ligands, preferably in excess (based on the double metal cyanide compound), and optionally further complexing components are added.

The double metal cyanide compounds contained in the DMC catalysts according to the invention are the reaction products of water-soluble metal salts and water-soluble metal cyanide salts.

For example, an aqueous solution of zinc chloride (preferably in excess, based on the metal cyanide salt, such as, for example, potassium hexacyanocobaltate) and potassium hexacyanocobaltate are mixed and dimethoxyethane (glyme) or tert-butanol (preferably in excess, based on zinc hexacyanocobaltate) is then added to the suspension formed.

Metal salts which are suitable for the preparation of the double metal cyanide compounds preferably have the general formula (III)

$$M(X)_n \tag{III}$$

wherein

M is chosen from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, preferably M is $Zn^{2+}$, $Fe^{2+}$, $Co^{2+}$ or $Ni^{2+}$, X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 if X=sulfate, carbonate or oxalate and n is 2 if X=halide, hydroxide, carboxylate, cyanate, thiocyanate, isocyanate, isothiocyanate or nitrate, or suitable metal salts have the general formula (IV)

$$M_r(X)_3 \qquad (IV)$$

wherein

M is chosen from the metal cations $Fe^{3+}$, $Al^{3+}$, $Co^{3+}$ and $Cr^{3+}$, X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 if X=sulfate, carbonate or oxalate and r is 1 if X=halide, hydroxide, carboxylate, cyanate, thiocyanate, isocyanate, isothiocyanate or nitrate, or suitable metal salts have the general formula (V)

$$M(X)_s \qquad (V)$$

wherein

M is chosen from the metal cations $Mo^{4+}$, $V^{4+}$ and $W^{4+}$.

X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 if X=sulfate, carbonate or oxalate and s is 4 if X=halide, hydroxide, carboxylate, cyanate, thiocyanate, isocyanate, isothiocyanate or nitrate, or suitable metal salts have the general formula (VI)

$$M(X)_t \qquad (VI)$$

wherein

M is chosen from the metal cations $Mo^{6+}$ and $W^{6+}$

X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 if X=sulfate, carbonate or oxalate and t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron (II) chloride, iron(III) chloride, cobalt(II) chloride, cobalt(II) thiocyanate, nickel(II) chloride and nickel(II) nitrate. Mixtures of various metal salts can also be employed.

Metal cyanide salts which are suitable for the preparation of the double metal cyanide compounds preferably have the general formula (VII)

$$(Y)_aM'(CN)_b(A)_c \qquad (VII)$$

wherein

M' is chosen from one or more metal cations of the group consisting of Fe(II), Fe(III), Co(II), Co(III), Cr(II), Cr(III), Mn(II), Mn(III), Ir(III), Ni(II), Rh(III), Ru(II), V(IV) and V(V), preferably M' is one or more metal cations of the group consisting of Co(II), Co(III), Fe(II), Fe(III), Cr(III), Ir(III) and Ni(II), Y is chosen from one or more metal cations of the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is chosen from one or more anions of the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and a, b and c are integers, wherein the values for a, b and c are chosen such that the metal cyanide salt has electroneutrality; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate (III), calcium hexacyanocobaltate(III) and lithium hexacyanocobaltate(III).

Preferred double metal cyanide compounds which the DMC catalysts according to the invention contain are compounds of the general formula (VIII)

$$M_x[M'_{x'}(CN)_y]_z \qquad (VIII),$$

wherein M is as defined in formula (II) to (VI) and

M' is as defined in formula (VII), and x, x', y and z are integers and are chosen such that the double metal cyanide compound has electroneutrality.

Preferably x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate (III). Further examples of suitable double metal cyanide compounds are to be found e.g. in U.S. Pat. No. 5,158,922 (column 8, lines 29-66). Zinc hexacyanocobaltate(III) is particularly preferably used.

The organic complexing ligands added in the preparation of the DMC catalysts are disclosed, for example, in U.S. Pat. No. 5,158,922 (see in particular column 6, lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). For example, water-soluble, organic compounds with hetero atoms, such as oxygen, nitrogen, phosphorus or sulfur, which can form complexes with the double metal cyanide compound are employed as organic complexing ligands. Preferred organic complexing ligands are alcohols, aldehydes, ketones, ethers, esters, amides, ureas, nitriles, sulfides and mixtures thereof. Particularly preferred organic complexing ligands are aliphatic ethers (such as dimethoxyethane), water-soluble aliphatic alcohols (such as ethanol, isopropanol, n-butanol, iso-butanol, sec-butanol, tert-butanol, 2-methyl-3-buten-2-ol and 2-methyl-3-butyn-2-ol), and compounds which contain both aliphatic or cycloaliphatic ether groups and aliphatic hydroxyl groups (such as e.g. ethylene glycol mono-tert-butyl ether, diethylene glycol mono-tert-butyl ether, tripropylene glycol monomethyl ether and 3-methyl-3-oxetane-methanol). Organic complexing ligands which are most preferred are chosen from one or more compounds of the group consisting of dimethoxyethane, tert-butanol, 2-methyl-3-buten-2-ol, 2-methyl-3-butyn-2-ol, ethylene glycol mono-tert-butyl ether and 3-methyl-3-oxetane-methanol.

One or more complexing component(s) from the compound classes of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals, or of glycidyl ethers, glycosides, carboxylic acid esters of polyfunctional alcohols, bile acids or salts, esters or amides thereof, cyclodextrins, phosphorus compounds, $\alpha,\beta$-unsaturated carboxylic acid esters or ionic surface- or interface-active compounds are optionally employed in the preparation of the DMC catalysts according to the invention.

Preferably, in the first step in the preparation of the DMC catalysts according to the invention the aqueous solutions of the metal salt (e.g. zinc chloride), employed in a stoichiometric excess (at least 50 mol %), based on the metal cyanide salt, that is to say at least a molar ratio of metal salt to metal cyanide salt of 2.25 to 1.00, and of the metal cyanide salt (e.g. potassium hexacyanocobaltate) are reacted in the presence of the organic complexing ligands (e.g. tert-butanol), a suspension which contains the double metal cyanide compound (e.g. zinc hexacyanocobaltate), water, excess metal salt and the organic complexing ligand being formed.

In this context, the organic complexing ligand can be present in the aqueous solution of the metal salt and/or of the metal cyanide salt, or it is added directly to the suspension obtained after precipitation of the double metal cyanide compound. It has proved to be advantageous to mix the aqueous solutions of the metal salt and of the metal cyanide salt and the organic complexing ligand with vigorous stirring. The suspension formed in the first step is then optionally treated with a further complexing component. In this context, the complexing component is preferably employed in a mixture with water and organic complexing ligand. A preferred method for carrying out the first step (i.e. the preparation of the suspension) is carried out employing a mixing nozzle, particularly preferably employing a jet disperser as described in WO-A 01/39883.

In the second step the solid (i.e. the precursor of the catalyst according to the invention) is isolated from the suspension by known techniques, such as centrifugation or filtration.

In a preferred embodiment variant, in a third process step the solid which has been isolated is subsequently washed with an aqueous solution of the organic complexing ligand (e.g. by resuspending and subsequent renewed isolation by filtration or centrifugation). In this manner, for example, water-soluble by-products, such as potassium chloride, can be removed from the catalyst according to the invention. Preferably, the amount of organic complexing ligand in the aqueous washing solution is between 40 and 80 wt. %, based on the total solution.

In the third step, further complexing component is optionally added to the aqueous washing solution, preferably in the range of between 0.5 and 5 wt. %, based on the total solution.

It is moreover advantageous for the solid isolated to be washed more than once. Preferably, washing is carried out in a first washing step (iii-1) with an aqueous solution of the unsaturated alcohol (e.g. by resuspending and subsequent renewed isolation by filtration or centrifugation), in order to remove, for example, water-soluble by-products, such as potassium chloride, from the catalyst according to the invention in this manner. Particularly preferably, the amount of unsaturated alcohol in the aqueous washing solution is between 40 and 80 wt. %, based on the total solution of the first washing step. In the further washing steps (iii-2), either the first washing step is repeated once or several times, preferably once to three times, or, preferably, a non-aqueous solution, such as e.g. a mixture or solution of unsaturated alcohol and further complexing component (preferably in the range between 0.5 and 5 wt. %, based on the total amount of the washing solution of step (iii-2)), is employed as the washing solution and the solid is washed with this once or several times, preferably once to three times.

The solid which has been isolated and optionally washed is then dried, optionally after pulverization, at temperatures of in general 20-100° C. and under pressures of from in general 0.1 mbar to normal pressure (1013 mbar).

A preferred method for isolating the DMC catalysts according to the invention from the suspension by filtration, washing of the filter cake and drying is described in WO-A 01/80994.

The polyether carbonate polyols obtainable by the process according to the invention can be processed without problems, in particular by reaction with di- and/or polyisocyanates, to give polyurethanes, in particular flexible polyurethane foams. For polyurethane uses, polyether carbonate polyols which are based on an H-functional starter compound which has a functionality of at least 2 are preferably employed. The polyether carbonate polyols obtainable by the process according to the invention can furthermore be used in uses such as detergent and cleaning agent formulations, drilling liquids, fuel additives, ionic and nonionic surfactants, lubricants, process chemicals for papermaking or textile production or cosmetic formulations. It is known to the person skilled in the art that, depending on the particular field of use, the polyether carbonate polyols to be used must comply with certain substance properties, such as, for example, molecular weight, viscosity, functionality and/or hydroxyl number.

EXAMPLES

H-functional starter compounds employed (starters):

PET-1 difunctional poly(oxypropylene) polyol with an OH number of 112 $mg_{KOH}/g$ PET-2 difunctional poly(oxypropylene) polyol with an OH number of 261 $mg_{KOH}/g$ PET-3 trifunctional poly(oxypropylene) polyol with an OH number of 400 $mg_{KOH}/g$ The DMC catalyst was prepared in accordance with Example 6 of WO-A 01/80994.

The 300 ml pressure reactor employed in the examples had a height (internal) of 10.16 cm and an internal diameter of 6.35 cm. The reactor was equipped with an electric heating jacket (510 watt maximum heating power). The counter-cooling comprised an immersed tube curved in a U-shape with an external diameter of 6 mm, which projected into the reactor to 5 mm above the base and through which cooling water of approx. 10° C. flowed. The stream of water was turned on and off via a solenoid valve. The reactor was furthermore equipped with an inlet tube and a thermocouple of 1.6 mm diameter which projected into the reactor to 3 mm above the base.

The heating power of the electric heating jacket during the activation [step ($\beta$)] was on average approx. 20% of the maximum heating power. The heating power varied around ±5% of the maximum heating power by the adjustment. The occurrence of an increased evolution of heat in the reactor caused by the rapid reaction of propylene oxide during the activation of the catalyst [step ($\beta$)] was observed via a reduced heating power of the heating jacket, turning on of the counter-cooling and, where appropriate, an increase in temperature in the reactor. The occurrence of an evolution of heat in the reactor caused by the continuous reaction of propylene oxide during the reaction [step (γ)] led to a lowering of the power of the heating jacket to approx. 8% of the maximum heating power. The heating power varied around ±5% of the maximum heating power by the adjustment.

The hollow shaft stirrer employed in the examples was a hollow shaft stirrer with which the gas was passed into the reaction mixture via a hollow shaft of the stirrer. The stirrer body mounted on the hollow shaft had four arms with a diameter of 35 mm and a height of 14 mm. Two gas outlets which had a diameter of 3 mm were mounted at each end of the arm. By the rotation of the stirrer, a reduced pressure developed such that the gas ($CO_2$ and where appropriate alkylene oxide) above the reaction mixture was sucked off and was passed into the reaction mixture via the hollow shaft of the stirrer.

The impeller stirrer employed in the examples was an angled blade turbine in which two stirrer stages in total with four stirrer blades each (45°), which had a diameter of 35 mm and a height of 10 mm were mounted on the stirrer shaft at a distance of 7 mm.

In the copolymerization, in addition to the cyclic propylene carbonate, the polyether carbonate polyol which on the one hand contains the polycarbonate units shown in formula (IXa)

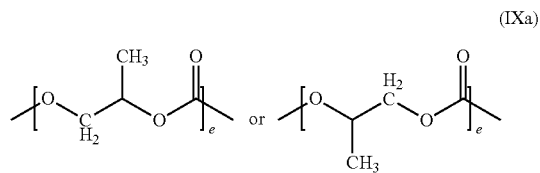

(IXa)

and on the other hand contains the polyether units shown in formula (IXb)

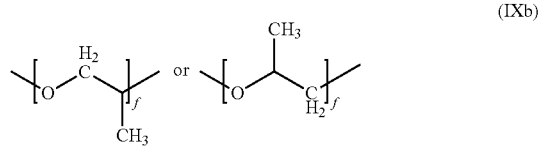

(IXb)

resulted.

The reaction mixture was characterized by $^1$H-NMR spectroscopy and gel permeation chromatography:

The ratio of the amount of cyclic propylene carbonate to polyether carbonate polyol (selectivity) and the molar ratio of carbonate groups to ether groups in the polyether carbonate polyol (ratio e/f) and the amount of propylene oxide reacted (C in mol %) were determined by means of $^1$H-NMR spectroscopy. The sample was in each case dissolved in deuterated chloroform and measured on a Bruker spectrometer (AV400, 400 MHz). The relevant resonances in the $^1$H-NMR spectrum (based on TMS=0 ppm) which were used for the integration are as follows:

I1: 1.11-1.17: Methyl group of the polyether units, area of the resonance corresponds to three H atoms
I2: 1.25-1.32: Methyl group of the polycarbonate units, area of the resonance corresponds to three H atoms
I3: 1.45-1.49: Methyl group of the cyclic carbonate, area of the resonance corresponds to three H atoms
I4: 2.95-2.99: CH group for free, unreacted propylene oxide, area of the resonance corresponds to one H atom The molar ratio of the amount of cyclic propylene carbonate to carbonate units in the polyether carbonate polyol (selectivity, g/e) and the molar ratio of carbonate groups to ether groups in the polyether carbonate polyol (e/f) and the content of propylene oxide reacted (C in mol %) are stated.

Taking into account the relative intensities, the values were calculated as follows:

Molar ratio of the amount of cyclic propylene carbonate to carbonate units in the polyether carbonate polyol (selectivity, g/e):

$$g/e = I3/I2 \tag{X}$$

Molar ratio of carbonate groups to ether groups in the polymer (e/f):

$$e/f = I2/I1 \tag{XI}$$

The molar content of propylene oxide reacted (C in mol %), based on the sum of the amount of propylene oxide employed in the activation and the copolymerization, is calculated according to the formula:

$$C = [((I1/3)+(I2/3)+(I3/3))/((I1/3)+(I2/3)+(I3/3)+I4)]*100\% \tag{XII}$$

and was between 97.8 and >99.9% in the examples.

The number-average molecular weight $M_n$ and the weight-average molecular weight $M_w$ of the polymers formed were determined by means of gel permeation chromatography (GPC). The procedure was in accordance with DIN 55672-1: "Gel permeation chromatography, Part 1—Tetrahydrofuran as the eluting agent" (SECurity GPC System from PSS Polymer Service, flow rate 1.0 ml/min; columns: 2×PSS SDV linear M, 8×300 mm, 5 μm; RID detector). Polystyrene samples of known molecular weight were used here for the calibration.

The OH number (hydroxyl number) was determined in accordance with DIN 53240-2, N-methylpyrrolidone being used as the solvent, however, instead of THF/methylene chloride. Titration was carried out with 0.5 molar ethanolic KOH solution (end point detection by means of potentiometry). Castor oil with an OH number specified by certificate served as the test substance. The unit stated in "mg/g" relates to mg[KOH]/g[polyether carbonate polyol].

The following Examples 1 to 5 were carried out with PET-1 as the starter. The pressures stated relate to the absolute pressure.

Example 1

Polymerization of Propylene Oxide and $CO_2$ Using a DMC Catalyst Dried Under Argon and Activated Under a $CO_2$ Atmosphere A mixture of DMC catalyst (23.8 mg) and PET-1 (30 g) was initially introduced into a 300 ml pressure reactor equipped with a hollow shaft stirrer. The reactor was closed and the pressure in the reactor was reduced to 5 mbar for five minutes. The pressure in the reactor was then regulated to 50 mbar by applying a gentle stream of Ar and simultaneously removing the gas with a pump. The reactor was heated up to 130° C. and the mixture was stirred (1,500 rpm) for 30 min at 130° C. under reduced pressure (50 mbar) and a gentle stream of Ar [step (α)]. 15 bar of $CO_2$ were forced in, as a result of which the temperature in the reactor fell slightly. The temperature was adjusted to 130° C. and during the following steps the pressure in the reactor was kept at 15 bar by topping up with $CO_2$. 3 g of propylene oxide were metered in with the aid of an HPLC pump (1.5 ml/min) and the reaction mixture was stirred for 20 min (1,500 rpm). 3 g of propylene oxide were subsequently metered in a further two times with the aid of the HPLC pump (1.5 ml/min) and the reaction mixture was stirred for 20 min each time (1,500 rpm). The occurrence of a briefly increased evolution of heat in the reactor during this time confirmed the activation of the catalyst [step (β)]. After cooling to 100° C., a further 81 g of propylene oxide were metered in via an HPLC pump (1.5 ml/min) while stirring, the reaction mixture being stirred further (1,500 rpm). The mixture was stirred at 100° C. for 3 h in total from the start of the addition of propylene oxide [step (γ)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.06.

The molar ratio of carbonate groups to ether groups in the polyether carbonate polyol e/f was 20.1/79.9.

The polyether carbonate polyol obtained had a molecular weight $M_n$=5,756 g/mol, $M_w$=13,076 g/mol and a polydispersity of 2.27.

The OH number of the mixture obtained was 26.6 $mg_{KOH}$/g.

Example 2

Polymerization of Propylene Oxide and $CO_2$ Using a DMC Catalyst Dried Under a $CO_2$ Atmosphere and Activated Under a $CO_2$ Atmosphere A mixture of DMC catalyst (23.8 mg) and PET-1 (30 g) was initially introduced into a 300 ml pressure reactor equipped with a hollow shaft stirrer. The reactor was closed and the pressure in the reactor was reduced to 5 mbar for five minutes. The pressure in the reactor was then regulated to 50 mbar by applying a gentle stream of $CO_2$ and simultaneously removing the gas with a pump. The reactor was heated up to 130° C. and the mixture was stirred (1,500 rpm) for 30 min at 130° C. under reduced pressure (50 mbar) and a gentle stream of $CO_2$ [step (α)]. 15 bar of $CO_2$ were forced in, as a result of which the temperature in the reactor fell slightly. The temperature was adjusted to 130° C. and during the following steps the pressure in the reactor was kept at 15 bar by topping up with $CO_2$. 3 g of propylene oxide were metered in with the aid of an HPLC pump (1.5 ml/min) and the reaction mixture was stirred for in each case 20 min (1,500 rpm). 3 g of propylene oxide were subsequently metered in a further two times with the aid of the HPLC pump (1.5 ml/min) and the reaction mixture was stirred for 20 min (1,500 rpm) [step (β)]. After cooling to 100° C., a further 81 g of propylene oxide were metered in via an HPLC pump (1.5 ml/min) while stirring, the reaction mixture being stirred further (1,500 rpm). The mixture was stirred at 100° C. for 3 h in total from the start of the addition of propylene oxide [step (γ)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.07.

The molar ratio of carbonate groups to ether groups in the polyether carbonate polyol e/f was 20.5/79.5.

The polyether carbonate polyol obtained had a molecular weight $M_n$=6,730 g/mol, $M_w$=15,686 g/mol and a polydispersity of 2.33.

The OH number of the mixture obtained was 25.1 $mg_{KOH}$/g.

Example 3

Polymerization of Propylene Oxide and $CO_2$ Using a DMC Catalyst Dried without $CO_2$ and Activated without $CO_2$ A mixture of DMC catalyst (23.8 mg) and PET-1 (30 g) was initially introduced into a 300 ml pressure reactor equipped with a hollow shaft stirrer. The reactor was closed and the pressure in the reactor was reduced to 5 mbar for five minutes. The pressure in the reactor was then regulated to 50 mbar (absolute) by applying a gentle stream of Ar and simultaneously removing the gas with a pump. The reactor was heated up to 130° C. and the mixture was stirred (1,500 rpm) for 30 min at 130° C. under a slight vacuum (50 mbar) and a gentle stream of Ar [step (α)]. 2.5 bar of argon were forced in. 3 g of propylene oxide were then metered in with the aid of an HPLC pump (1.5 ml/min) and the reaction mixture was stirred for in each case 20 min (1,500 rpm). 3 g of propylene oxide were subsequently metered in a further two times with the aid of the HPLC pump (1.5 ml/min) and the reaction mixture was stirred for 20 min (1,500 rpm). [Step (β)]. After cooling to 100° C., the argon pressure was let down and 15 bar of $CO_2$ were forced in. During the following steps the pressure in the reactor was kept at 15 bar by topping up with $CO_2$. While stirring, a further 81 g of propylene oxide were metered in via an HPLC pump (1.5 ml/min), the reaction mixture being stirred further (1,500 rpm). The mixture was stirred at 100° C. for 3 h in total from the start of the addition of propylene oxide [step (γ)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.08.

The molar ratio of carbonate groups to ether groups in the polyether carbonate polyol e/f was 18.1/81.9.

The polyether carbonate polyol obtained had a molecular weight $M_n$=5,644 g/mol, $M_w$=9,576 g/mol and a polydispersity of 1.70.

The OH number of the mixture obtained was 25.0 $mg_{KOH}$/g.

Example 4

Polymerization of Propylene Oxide and $CO_2$ Using a DMC Catalyst Dried with $CO_2$ and Activated without $CO_2$ A mixture of DMC catalyst (23.8 mg) and PET-1 (30 g) was initially introduced into a 300 ml pressure reactor equipped with a hollow shaft stirrer. The reactor was closed and the pressure in the reactor was reduced to 5 mbar for five minutes. The pressure in the reactor was then regulated to 50 mbar by applying a gentle stream of $CO_2$ and simultaneously removing the gas with a pump. The reactor was heated up to 130° C. and the mixture was stirred (1,500 rpm) for 30 min at 130° C. under a slight vacuum (50 mbar) and a gentle stream of $CO_2$. The pressure was subsequently lowered to 5 mbar by turning off the $CO_2$ stream [step (α)]. 2.5 bar of argon were forced in. 3 g of propylene oxide were then metered in with the aid of an HPLC pump (1.5 ml/min) and the reaction mixture was stirred for in each case 20 min (1,500 rpm). 3 g of propylene oxide were subsequently metered in a further two times with the aid of the HPLC pump (1.5 ml/min) and the reaction mixture was stirred for 20 min (1,500 rpm). [Step (β)]. After cooling to 100° C., the argon pressure was let down and 15 bar of $CO_2$ were forced in. During the following steps the pressure in the reactor was kept at 15 bar by topping up with $CO_2$. While stirring, a further 81 g of propylene oxide were metered in via an HPLC pump (1.5 ml/min), the reaction mixture being stirred further (1,500 rpm). The mixture was stirred at 100° C. for 3 h in total from the start of the addition of propylene oxide [step (γ)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

While stirring, a further 81 g of propylene oxide were metered in via an HPLC pump (1.5 ml/min), the reaction mixture being stirred further (1,500 rpm). The mixture was stirred at 100° C. for 3 h in total from the start of the addition of propylene oxide [step (γ)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.08.

The molar ratio of carbonate groups to ether groups in the polyether carbonate polyol e/f was 17.5/82.5.

The polyether carbonate polyol obtained had a molecular weight $M_n$=6,474 g/mol, $M_w$=9,413 g/mol and a polydispersity of 1.45.

The OH number of the mixture obtained was 28.2 $mg_{KOH}$/g.

TABLE 1

Overview of the results of Examples 1 to 5

| Example | Stirrer type | Drying (step α) | Activation (step β) | g/e | e/f | OH number [$mg_{KOH}$/g] |
|---|---|---|---|---|---|---|
| 1 | hollow shaft | without $CO_2$ | under $CO_2$ | 0.06 | 20.1/79.9 | 26.6 |
| 2 | hollow shaft | under $CO_2$ | under $CO_2$ | 0.07 | 20.5/79.5 | 25.1 |
| 3 | hollow shaft | without $CO_2$ | without $CO_2$ | 0.08 | 18.1/81.9 | 25.0 |
| 4 | hollow shaft | under $CO_2$ | without $CO_2$ | 0.07 | 18.5/81.5 | 25.8 |
| 5 (comp.) | impeller | without $CO_2$ | without $CO_2$ | 0.08 | 17.5/82.5 | 28.2 | comp.: comparison example

The selectivity g/e was 0.07.

The molar ratio of carbonate groups to ether groups in the polyether carbonate polyol e/f was 18.5/81.5.

The polyether carbonate polyol obtained had a molecular weight $M_n$=5,905 g/mol, $M_w$=10,757 g/mol and a polydispersity of 1.82.

The OH number of the mixture obtained was 25.8 $mg_{KOH}$/g.

Comparison Example 5

Polymerization of Propylene Oxide and $CO_2$ Using a DMC Catalyst Dried without $CO_2$ and Activated without $CO_2$, Using an Impeller Stirrer A mixture of DMC catalyst (23.8 mg) and PET-1 (30 g) was initially introduced into a 300 ml pressure reactor equipped with an impeller stirrer. The reactor was closed and the pressure in the reactor was reduced to 5 mbar for five minutes. The pressure in the reactor was then regulated to 50 mbar (absolute) by applying a gentle stream of Ar and simultaneously removing the gas with a pump. The reactor was heated up to 130° C. and the mixture was stirred (1,500 rpm) for 30 min at 130° C. under a slight vacuum (50 mbar) and a gentle stream of Ar [step (α)]. 2.5 bar of argon were forced in. 3 g of propylene oxide were then metered in with the aid of an HPLC pump (1.5 ml/min) and the reaction mixture was stirred for in each case 20 min (1,500 rpm). 3 g of propylene oxide were subsequently metered in a further two times with the aid of the HPLC pump (1.5 ml/min) and the reaction mixture was stirred for 20 min (1,500 rpm). [Step (β)]. After cooling to 100° C., the argon pressure was let down and 15 bar of $CO_2$ were forced in. During the following steps the pressure in the reactor was kept at 15 bar by topping up with $CO_2$.

The ratio e/f is a measure of the efficiency of the incorporation of carbon dioxide into the polymer chain: the higher the value of this ratio, the higher the content of the carbon dioxide in the reaction mixture incorporated into the polymer. A comparison of Example 3 with Comparison Example 5 shows that the use of a hollow shaft stirrer leads to a higher incorporation of $CO_2$ than when an impeller stirrer is used. A comparison of Example 1 with Example 3 shows that a further improvement in favour of a higher incorporation of $CO_2$ is achieved if the activation (step (β)) is carried out under a $CO_2$ atmosphere. This is also confirmed by the comparison of Example 2 with Example 4.

The following Examples 6 to 9 were carried out with PET-1 as the starter. The pressures stated relate to the absolute pressure.

Example 6

Polymerization of Propylene Oxide and $CO_2$ Using a DMC Catalyst Dried Under Argon and Activated Under a $CO_2$ Atmosphere, Using a Hollow Shaft Stirrer at a Low Speed of Rotation A mixture of DMC catalyst (23.8 mg) and PET-1 (60 g) was initially introduced into a 300 ml pressure reactor equipped with a hollow shaft stirrer. The reactor was closed and the pressure in the reactor was reduced to 5 mbar for five minutes. The pressure in the reactor was then regulated to 50 mbar by applying a gentle stream of Ar and simultaneously removing the gas with a pump. The reactor was heated up to 130° C. and the mixture was stirred (800 rpm) for 30 min at 130° C. under reduced pressure (50 mbar) and a gentle stream of Ar [step (α)]. 15 bar of $CO_2$ were forced in, as a result of which the temperature in the reactor fell slightly. The temperature was adjusted to 130° C. and during the following steps the pressure in the reactor was kept at 15 bar by topping up with $CO_2$. 6 g of propylene oxide were metered in with the aid of an HPLC pump (1.5 ml/min) and the reaction mixture was stirred for in each case 20 min (800 rpm). 6 g of propylene oxide were subsequently metered in a further two times with the aid of the HPLC pump (1.5 ml/min) and the reaction mixture was stirred for 20 min (800 rpm). The occurrence of a briefly increased evolution of heat in the reactor during this time confirmed the activation of the catalyst [step (β)]. After cooling to 100° C., a further 42 g of propylene oxide were metered in via an HPLC pump (1.5 ml/min) while stirring, the reaction mixture being stirred further (800 rpm). The mixture was stirred at 100° C. for 3 h in total from the start of the addition of propylene oxide [step (γ)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.09.

The molar ratio of carbonate groups to ether groups in the polyether carbonate polyol e/f was 14.1/85.9.

The polyether carbonate polyol obtained had a molecular weight $M_n$=2,954 g/mol, $M_w$=6,437 g/mol and a polydispersity of 2.18.

The OH number of the mixture obtained was 48.6 $mg_{KOH}$/g.

Example 7

Polymerization of Propylene Oxide and $CO_2$ Using a DMC Catalyst Dried Under Argon and Activated Under a $CO_2$ Atmosphere, Using a Hollow Shaft Stirrer at a High Speed of Rotation A mixture of DMC catalyst (23.8 mg) and PET-1 (60 g) was initially introduced into a 300 ml pressure reactor equipped with a hollow shaft stirrer. The reactor was closed and the pressure in the reactor was reduced to 5 mbar for five minutes. The pressure in the reactor was then regulated to 50 mbar by applying a gentle stream of Ar and simultaneously removing the gas with a pump. The reactor was heated up to 130° C. and the mixture was stirred (1,500 rpm) for 30 min at 130° C. under reduced pressure (50 mbar) and a gentle stream of Ar [step (α)]. 15 bar of $CO_2$ were forced in, as a result of which the temperature in the reactor fell slightly. The temperature was adjusted to 130° C. and during the following steps the pressure in the reactor was kept at 15 bar by topping up with $CO_2$. 6 g of propylene oxide were metered in with the aid of an HPLC pump (1.5 ml/min) and the reaction mixture was stirred for in each case 20 min (1,500 rpm). 6 g of propylene oxide were subsequently metered in a further two times with the aid of the HPLC pump (1.5 ml/min) and the reaction mixture was stirred for 20 min (1,500 rpm). The occurrence of a briefly increased evolution of heat in the reactor during this time confirmed the activation of the catalyst [step (β)]. After cooling to 100° C., a further 42 g of propylene oxide were metered in via an HPLC pump (1.5 ml/min) while stirring, the reaction mixture being stirred further (1,500 rpm). The mixture was stirred at 100° C. for 3 h in total from the start of the addition of propylene oxide [step (γ)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.15.

The molar ratio of carbonate groups to ether groups in the polyether carbonate polyol e/f was 13.5/86.5.

The polyether carbonate polyol obtained had a molecular weight $M_n$=2,380 g/mol, $M_w$=2,398 g/mol and a polydispersity of 1.01.

The OH number of the mixture obtained was 48.6 $mg_{KOH}$/g.

Comparison Example 8

Polymerization of Propylene Oxide and $CO_2$ Using a DMC Catalyst Dried Under Argon and Activated Under a $CO_2$ Atmosphere, Using an Impeller Stirrer at a Low Speed of Rotation A mixture of DMC catalyst (23.8 mg) and PET-1 (60 g) was initially introduced into a 300 ml pressure reactor equipped with an impeller stirrer. The reactor was closed and the pressure in the reactor was reduced to 5 mbar for five minutes. The pressure in the reactor was then regulated to 50 mbar by applying a gentle stream of Ar and simultaneously removing the gas with a pump. The reactor was heated up to 130° C. and the mixture was stirred (800 rpm) for 30 min at 130° C. under reduced pressure (50 mbar) and a gentle stream of Ar [step (α)]. 15 bar of $CO_2$ were forced in, as a result of which the temperature in the reactor fell slightly. The temperature was adjusted to 130° C. and during the following steps the pressure in the reactor was kept at 15 bar by topping up with $CO_2$. 6 g of propylene oxide were metered in with the aid of an HPLC pump (1.5 ml/min) and the reaction mixture was stirred for 20 min (800 rpm). 6 g of propylene oxide were subsequently metered in a further two times with the aid of the HPLC pump (1.5 ml/min) and the reaction mixture was stirred for 20 min each time (800 rpm). The occurrence of a briefly increased evolution of heat in the reactor during this time confirmed the activation of the catalyst [step (β)]. After cooling to 100° C., a further 42 g of propylene oxide were metered in via an HPLC pump (1.5 ml/min) while stirring, the reaction mixture being stirred further (800 rpm). The mixture was stirred at 100° C. for 3 h in total from the start of the addition of propylene oxide [step (γ)]. The reaction was ended by subsequently cooling the reaction mixture to room temperature, the increased pressure was let down and the resulting product was analysed.

NMR spectroscopy analysis of the reaction mixture showed that the reaction mixture contains still unreacted propylene oxide.

The selectivity g/e was 0.14.

The molar ratio of carbonate groups to ether groups in the polyether carbonate polyol e/f was 11.2/88.8.

The polyether carbonate polyol obtained had a molecular weight $M_n$=1,830 g/mol, $M_w$=2,170 g/mol and a polydispersity of 1.18.

The OH number of the mixture obtained was 56.5 $mg_{KOH}$/g.

Comparison Example 9

Polymerization of Propylene Oxide and $CO_2$ Using a DMC Catalyst Dried Under Argon and Activated Under a $CO_2$ Atmosphere, Using an Impeller Stirrer at a High Speed of Rotation A mixture of DMC catalyst (23.8 mg) and PET-1 (60 g) was initially introduced into a 300 ml pressure reactor equipped with an impeller stirrer. The reactor was closed and the pressure in the reactor was reduced to 5 mbar for five minutes. The pressure in the reactor was then regulated to 50 mbar by applying a gentle stream of Ar and simultaneously removing the gas with a pump. The reactor was heated up to 130° C. and the mixture was stirred (1,500 rpm) for 30 min at 130° C. under reduced pressure (50 mbar) and a gentle stream of Ar [step ($\alpha$)]. 15 bar of $CO_2$ were forced in, as a result of which the temperature in the reactor fell slightly. The temperature was adjusted to 130° C. and during the following steps the pressure in the reactor was kept at 15 bar by topping up with $CO_2$. 6 g of propylene oxide were metered in with the aid of an HPLC pump (1.5 ml/min) and the reaction mixture was stirred for 20 min (1,500 rpm). 6 g of propylene oxide were subsequently metered in a further two times with the aid of the HPLC pump (1.5 ml/min) and the reaction mixture was stirred for 20 min each time (1,500 rpm). The occurrence of a briefly increased evolution of heat in the reactor during this time confirmed the activation of the catalyst [step ($\beta$)]. After cooling to 100° C., a further 42 g of propylene oxide were metered in via an HPLC pump (1.5 ml/min) while stirring, the reaction mixture being stirred further (1,500 rpm). The mixture was stirred at 100° C. for 3 h in total from the start of the addition of propylene oxide [step ($\gamma$)]. The reaction was ended by subsequently cooling the reaction mixture to room temperature, the increased pressure was let down and the resulting product was analysed.

NMR spectroscopy analysis of the reaction mixture showed that the reaction mixture contains still unreacted propylene oxide.

The selectivity g/e was 0.17.

The molar ratio of carbonate groups to ether groups in the polyether carbonate polyol e/f was 10.3/89.7.

The polyether carbonate polyol obtained had a molecular weight $M_n$=1,840 g/mol, $M_w$=2,062 g/mol and a polydispersity of 1.12.

The OH number of the mixture obtained was 55.0 $mg_{KOH}$/g.

and 9 shows that the use of a hollow shaft stirrer leads to a higher incorporation of $CO_2$ and an improved selectivity (i.e. less cyclic carbonate) than when an impeller stirrer is used.

The following Examples 10 to 14 were carried out with PET-2 as the starter. The pressures stated relate to the absolute pressure.

Example 10

Polymerization of Propylene Oxide and $CO_2$ Using a DMC Catalyst Dried Under Argon and Activated Under a $CO_2$ Atmosphere A mixture of DMC catalyst (27.9 mg) and PET-2 (30 g) was initially introduced into a 300 ml pressure reactor equipped with a hollow shaft stirrer. The reactor was closed and the pressure in the reactor was reduced to 5 mbar for five minutes. The pressure in the reactor was then regulated to 50 mbar by applying a gentle stream of Ar and simultaneously removing the gas with a pump. The reactor was heated up to 130° C. and the mixture was stirred (1,500 rpm) for 30 min at 130° C. under reduced pressure (50 mbar) and a gentle stream of Ar [step ($\alpha$)]. 15 bar of $CO_2$ were forced in, as a result of which the temperature in the reactor fell slightly. The temperature was adjusted to 130° C. and during the following steps the pressure in the reactor was kept at 15 bar by topping up with $CO_2$. 3 g of propylene oxide were metered in with the aid of an HPLC pump (1.5 ml/min) and the reaction mixture was stirred for 20 min (1,500 rpm). 3 g of propylene oxide were subsequently metered in a further two times with the aid of the HPLC pump (1.5 ml/min) and the reaction mixture was stirred for 20 min each time (1,500 rpm). The occurrence of a briefly increased evolution of heat in the reactor during this time confirmed the activation of the catalyst [step ($\beta$)]. After cooling to 100° C., a further 100.5 g of propylene oxide were metered in via an HPLC pump (1.5 ml/min) while stirring, the reaction mixture being stirred further (1,500 rpm). The mixture was stirred at 100° C. for 3 h in total from the start of the addition of propylene oxide [step ($\gamma$)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.13.

The molar ratio of carbonate groups to ether groups in the polyether carbonate polyol e/f was 15.9/84.1.

TABLE 2

Overview of the results of Examples 6 to 9

| Example | Stirrer type | Stirring speed [rpm] | Drying (step $\alpha$) | Activation (step $\beta$) | g/e | e/f | OH number [$mg_{KOH}$/g] |
|---|---|---|---|---|---|---|---|
| 6 | hollow shaft | 800 | without $CO_2$ | under $CO_2$ | 0.09 | 14.1/85.9 | 48.6 |
| 7 | hollow shaft | 1,500 | without $CO_2$ | under $CO_2$ | 0.15 | 13.5/86.5 | 54.0 |
| 8 (comp.) | impeller | 800 | without $CO_2$ | under $CO_2$ | 0.14 | 11.2/88.8 | 56.5 |
| 9 (comp.) | impeller | 1,500 | without $CO_2$ | under $CO_2$ | 0.17 | 10.3/89.7 | 55.0 | comp.: comparison example

The ratio e/f is a measure of the efficiency of the incorporation of carbon dioxide into the polymer chain: the higher the value of this ratio, the higher the content of the carbon dioxide in the reaction mixture incorporated into the polymer. A comparison of Examples 6 and 7 with Comparison Examples 8

The polyether carbonate polyol obtained had a molecular weight $M_n$=3,036 g/mol, $M_w$=4,899 g/mol and a polydispersity of 1.61.

The OH number of the mixture obtained was 56.2 $mg_{KOH}$/g.

Example 11

Polymerization of Propylene Oxide and $CO_2$ Using a DMC Catalyst Dried Under a $CO_2$ Atmosphere and Activated Under a $CO_2$ Atmosphere A mixture of DMC catalyst (27.9 mg) and PET-2 (30 g) was initially introduced into a 300 ml pressure reactor equipped with a hollow shaft stirrer. The reactor was closed and the pressure in the reactor was reduced to 5 mbar for five minutes. The pressure in the reactor was then regulated to 50 mbar by applying a gentle stream of $CO_2$ and simultaneously removing the gas with a pump. The reactor was heated up to 130° C. and the mixture was stirred (1,500 rpm) for 30 min at 130° C. under reduced pressure (50 mbar) and a gentle stream of $CO_2$ [step ($\alpha$)]. 15 bar of $CO_2$ were forced in, as a result of which the temperature in the reactor fell slightly. The temperature was adjusted to 130° C. and during the following steps the pressure in the reactor was kept at 15 bar by topping up with $CO_2$. 3 g of propylene oxide were metered in with the aid of an HPLC pump (1.5 ml/min) and the reaction mixture was stirred for in each case 20 min (1,500 rpm). 3 g of propylene oxide were subsequently metered in a further two times with the aid of the HPLC pump (1.5 ml/min) and the reaction mixture was stirred for 20 min (1,500 rpm) [step ($\beta$)]. After cooling to 100° C., a further 100.5 g of propylene oxide were metered in via an HPLC pump (1.5 ml/min) while stirring, the reaction mixture being stirred further (1,500 rpm). The mixture was stirred at 100° C. for 3 h in total from the start of the addition of propylene oxide [step ($\gamma$)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.14.

The molar ratio of carbonate groups to ether groups in the polyether carbonate polyol e/f was 15.0/85.0.

The polyether carbonate polyol obtained had a molecular weight $M_n$=3,187 g/mol, $M_w$=4,770 g/mol and a polydispersity of 1.50.

The OH number of the mixture obtained was 56.9 $mg_{KOH}$/g.

Example 12

Polymerization of Propylene Oxide and $CO_2$ Using a DMC Catalyst Dried Without $CO_2$ and Activated Without $CO_2$ A mixture of DMC catalyst (27.9 mg) and PET-2 (30 g) was initially introduced into a 300 ml pressure reactor equipped with a hollow shaft stirrer. The reactor was closed and the pressure in the reactor was reduced to 5 mbar for five minutes. The pressure in the reactor was then regulated to 50 mbar (absolute) by applying a gentle stream of Ar and simultaneously removing the gas with a pump. The reactor was heated up to 130° C. and the mixture was stirred (1,500 rpm) for 30 min at 130° C. under a slight vacuum (50 mbar) and a gentle stream of Ar [step ($\alpha$)]. 2.5 bar of argon were forced in. 3 g of propylene oxide were then metered in with the aid of an HPLC pump (1.5 ml/min) and the reaction mixture was stirred for in each case 20 min (1,500 rpm). 3 g of propylene oxide were subsequently metered in a further two times with the aid of the HPLC pump (1.5 ml/min) and the reaction mixture was stirred for 20 min (1,500 rpm). [Step ($\beta$)]. After cooling to 100° C., the argon pressure was let down and 15 bar of $CO_2$ were forced in. During the following steps the pressure in the reactor was kept at 15 bar by topping up with $CO_2$. While stirring, a further 100.5 g of propylene oxide were metered in via an HPLC pump (1.5 ml/min), the reaction mixture being stirred further (1,500 rpm). The mixture was stirred at 100° C. for 3 h in total from the start of the addition of propylene oxide [step ($\gamma$)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.16.

The molar ratio of carbonate groups to ether groups in the polyether carbonate polyol e/f was 14.6/85.4.

The polyether carbonate polyol obtained had a molecular weight $M_n$=3,067 g/mol, $M_w$=4,474 g/mol and a polydispersity of 1.46.

The OH number of the mixture obtained was 57.9 $mg_{KOH}$/g.

Example 13

Polymerization of Propylene Oxide and $CO_2$ Using a DMC Catalyst Dried with $CO_2$ and Activated without $CO_2$ A mixture of DMC catalyst (27.9 mg) and PET-2 (30 g) was initially introduced into a 300 ml pressure reactor equipped with a hollow shaft stirrer. The reactor was closed and the pressure in the reactor was reduced to 5 mbar for five minutes. The pressure in the reactor was then regulated to 50 mbar by applying a gentle stream of $CO_2$ and simultaneously removing the gas with a pump. The reactor was heated up to 130° C. and the mixture was stirred (1,500 rpm) for 30 min at 130° C. under a slight vacuum (50 mbar) and a gentle stream of $CO_2$. The pressure was subsequently lowered to 5 mbar by turning off the $CO_2$ stream [step ($\alpha$)]. 2.5 bar of argon were forced in. 3 g of propylene oxide were then metered in with the aid of an HPLC pump (1.5 ml/min) and the reaction mixture was stirred for in each case 20 min (1,500 rpm). 3 g of propylene oxide were subsequently metered in a further two times with the aid of the HPLC pump (1.5 ml/min) and the reaction mixture was stirred for 20 min (1,500 rpm). [Step ($\beta$)]. After cooling to 100° C., the argon pressure was let down and 15 bar of $CO_2$ were forced in. During the following steps the pressure in the reactor was kept at 15 bar by topping up with $CO_2$. While stirring, a further 100.5 g of propylene oxide were metered in via an HPLC pump (1.5 ml/min), the reaction mixture being stirred further (1,500 rpm). The mixture was stirred at 100° C. for 3 h in total from the start of the addition of propylene oxide [step ($\gamma$)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.15.

The molar ratio of carbonate groups to ether groups in the polyether carbonate polyol e/f was 12.2/87.8.

The polyether carbonate polyol obtained had a molecular weight $M_n$=3,180 g/mol, $M_w$=5,116 g/mol and a polydispersity of 1.61.

The OH number of the mixture obtained was 55.5 $mg_{KOH}$/g.

Comparison Example 14

Polymerization of Propylene Oxide and $CO_2$ Using a DMC Catalyst Dried without $CO_2$ and Activated without $CO_2$, Using an Impeller Stirrer A mixture of DMC catalyst (27.9 mg) and PET-2 (30 g) was initially introduced into a 300 ml pressure reactor equipped with an impeller stirrer. The reactor was closed and the pressure in the reactor was reduced to 5 mbar for five minutes. The pressure in the reactor was then regulated to 50 mbar (absolute) by applying a gentle stream of Ar and simultaneously removing the gas with a pump. The reactor was heated up to 130° C. and the mixture was stirred (1,500 rpm) for 30 min at 130° C. under a slight vacuum (50 mbar) and a gentle stream of Ar [step ($\alpha$)]. 2.5 bar of argon were forced in. 3 g of propylene oxide were then metered in with the aid of an HPLC pump (1.5 ml/min) and the reaction mixture was stirred for in each case 20 min (1,500 rpm). 3 g of propylene oxide were subsequently metered in a further two times with the aid of the HPLC pump (1.5 ml/min) and the reaction mixture was stirred for 20 min (1,500 rpm). [Step ($\beta$)]. After cooling to 100° C., the argon pressure was let down and 15 bar of $CO_2$ were forced in. During the following steps the pressure in the reactor was kept at 15 bar by topping up with $CO_2$. While stirring, a further 100.5 g of propylene oxide were metered in via an HPLC pump (1.5 ml/min), the reaction mixture being stirred further (1,500 rpm). The mixture was stirred at 100° C. for 3 h in total from the start of the addition of propylene oxide [step ($\gamma$)]. The reaction was ended by subsequently cooling the reaction mixture to room temperature, the increased pressure was let down and the resulting product was analysed.

NMR spectroscopy analysis of the reaction mixture showed a complete conversion of the propylene oxide.

The selectivity g/e was 0.13.

The molar ratio of carbonate groups to ether groups in the polyether carbonate polyol e/f was 9.1/90.9.

The polyether carbonate polyol obtained had a molecular weight $M_n$=1,979 g/mol, $M_w$=3,045 g/mol and a polydispersity of 1.54.

The OH number of the mixture obtained was 56.7 $mg_{KOH}$/g.

a $CO_2$ atmosphere. This is also confirmed by the comparison of Example 11 with Example 13.

The following Example 15 was carried out with PET-3 as the starter. The pressures stated relate to the absolute pressure.

Example 15

Polymerization of Propylene Oxide and $CO_2$ Using a DMC Catalyst Dried Under Argon and Activated Under a $CO_2$ Atmosphere A mixture of DMC catalyst (23.6 mg) and PET-3 (12.6 g) was initially introduced into a 300 ml pressure reactor equipped with a hollow shaft stirrer and the mixture was stirred (1,500 rpm) for 30 min at 130° C. under a slight vacuum (50 mbar) and a gentle stream of Ar [step ($\alpha$)]. 15 bar of $CO_2$ were forced in, as a result of which the temperature in the reactor fell slightly. The temperature was adjusted to 130° C. and during the following steps the pressure in the reactor was kept at 15 bar by topping up with $CO_2$. 1.3 g of propylene oxide were metered in with the aid of an HPLC pump (1.5 ml/min) and the reaction mixture was stirred for 20 min (1,500 rpm). 1.3 g of propylene oxide were subsequently metered in a further two times with the aid of the HPLC pump (1.5 ml/min) and the reaction mixture was stirred for 20 min each time (1,500 rpm). Occurrence of a briefly increased evolution of heat in the reactor during this time confirmed the activation of the catalyst. [Step ($\beta$)]. After cooling to 100° C., a further 103.6 g of propylene oxide were metered in via an HPLC pump (1.5 ml/min) while stirring, the reaction mixture being stirred further (1,500 rpm). The mixture was stirred at 100° C. for 3 h in total from the start of the addition of propylene oxide [step ($\gamma$)]. The reaction was ended by cooling the reactor in an ice-bath, the increased pressure was let down and the resulting product was analyzed.

No hot-spot was observed during the reaction [step ($\gamma$)].

NMR spectroscopy analysis of the reaction mixture showed a complete conversion of the propylene oxide.

The selectivity g/e was 0.18.

The molar ratio of carbonate groups to ether groups in the polyether carbonate polyol e/f was 21.2/73.3.

The polyether carbonate polyol obtained had a molecular weight $M_n$=5,460 g/mol, $M_w$=14,320 g/mol and a polydispersity of 2.62.

TABLE 3

Overview of the results of Examples 10 to 14

| Example | Stirrer type | Drying (step $\alpha$) | Activation (step $\beta$) | g/e | e/f | OH number [$mg_{KOH}$/g] |
|---|---|---|---|---|---|---|
| 10 | hollow shaft | without $CO_2$ | under $CO_2$ | 0.13 | 15.9/84.1 | 56.2 |
| 11 | hollow shaft | under $CO_2$ | under $CO_2$ | 0.14 | 15.0/85.0 | 56.9 |
| 12 | hollow shaft | without $CO_2$ | without $CO_2$ | 0.16 | 14.6/85.4 | 57.9 |
| 13 | hollow shaft | under $CO_2$ | without $CO_2$ | 0.15 | 12.2/87.8 | 55.5 |
| 14 (comp.) | impeller | without $CO_2$ | without $CO_2$ | 0.13 | 9.1/90.9 | 56.7 | comp.: comparison example

The ratio e/f is a measure of the efficiency of the incorporation of carbon dioxide into the polymer chain: the higher the value of this ratio, the higher the content of the carbon dioxide in the reaction mixture incorporated into the polymer. A comparison of Example 12 with Comparison Example 14 shows that the use of a hollow shaft stirrer leads to a higher incorporation of $CO_2$ than when an impeller stirrer is used. A comparison of Example 10 with Example 12 shows that a further improvement in favour of a higher incorporation of $CO_2$ is achieved if the activation (step ($\beta$) is carried out under The OH number of the mixture obtained was 40.6 $mg_{KOH}$/g.

The invention claimed is:

1. A process for the preparation of a polyether carbonate polyol from one or more H-functional starter compounds, one or more alkylene oxides and carbon dioxide in the presence of a double metal cyanide (DMC) catalyst, comprising
   ($\alpha$) introducing the one or more H-functional starter compounds or a mixture of at least two H-functional starter compounds into a reactor, (β) for activation, adding a part amount (based on the total amount of the amount of alkylene oxides employed in steps (β) and (γ)) of one or more alkylene oxides to the mixture resulting from step (α), optionally carrying out step (β) several times for the activation, (γ) metering continuously one or more alkylene oxides and carbon dioxide into the mixture resulting from step (β) ("copolymerization"), the alkylene oxides employed for the copolymerization being identical to or different from the alkylene oxides employed in step (β), wherein in step (γ) the carbon dioxide is passed into the mixture by
(i) gassing the reaction mixture in the reactor from the bottom,
(ii) using a hollow shaft stirrer,
(iii) a combination of the metering operations according to (i) and (ii), and/or
(iv) gassing over the surface of the liquid by using a stirrer unit configured in several stages.

2. The process according to claim 1, wherein in step (β) the addition of the part amount of one or more alkylene oxides is carried out under an atmosphere of an inert gas/carbon dioxide mixture or under a carbon dioxide atmosphere.

3. The process according to claim 1, wherein step (α) comprises
(α) (α1) introducing the DMC catalyst and one or more H-functional starter compounds into a reactor,
(α2) passing an inert gas, an inert gas/carbon dioxide mixture or carbon dioxide through the reactor at a temperature of from 50 to 200° C. and simultaneously establishing a reduced pressure (absolute) of from 10 mbar to 800 mbar is in the reactor by removal of the inert gas or carbon dioxide.

4. The process according to claim 1, wherein step (β) is carried out at temperatures of from 50 to 200° C.

5. The process according to claim 1, wherein the amount of one or more alkylene oxides in step (β) is 0.1 to 25.0 wt. % based on the amount of starter compound employed in step (α).

6. The process according to claim 1, wherein step (α) comprises
(α1) introducing the one or more H-functional starter compound or a mixture of at least two H-functional starter compounds is into a reactor, and
(α2) passing an inert gas, an inert gas/carbon dioxide mixture or carbon dioxide into the resulting mixture of the DMC catalyst and the one or more H-functional starter compounds at a temperature of from 50 to 200° C. and simultaneously establishing a reduced pressure (absolute) of from 10 mbar to 800 mbar by removal of the inert gas or carbon dioxide,
wherein the DMC catalyst is added to the one or more H-functional starter compounds or the mixture of at least two H-functional starter compounds in step (α1) or immediately subsequently in step (α2).

7. The process according to claim 2, wherein argon and/or nitrogen is employed as the inert gas.

8. The process according to claim 1, wherein in steps (β) and/or (γ) the carbon dioxide is passed into the mixture by gassing the reaction mixture in the reactor from the bottom via an inlet tube, via a gassing ring or via a combination of inlet tube or gassing ring with a gas distribution stirrer.

9. The process according to claim 8, wherein one or more stirrer stages are arranged on a stirrer shaft above the gas distribution stirrer.

10. The process according to claim 1, wherein in steps (β) and/or (γ) the carbon dioxide is passed into the mixture through a tubular stirrer or an angled blade turbine with hollow blades.

11. The process according to claim 1, wherein the one or more H-functional starter compounds are selected from at least one of the group consisting of alcohols, amines, thiols, amino alcohols, thioalcohols, hydroxy esters, polyether polyols, polyester polyols, polyester ether polyols, polycarbonate polyols, polyether carbonate polyols, polyethyleneimines, polyether-amines, polytetrahydrofurans, polyether thiols, polyacrylate polyols, castor oil, the mono- or diglyceride of ricinoleic acid, monoglycerides of fatty acids, and chemically modified mono-, di- and/or triglycerides of fatty acids and $C_1$-$C_{24}$-alkyl fatty acid esters which have on average at least 2 OH groups per molecule.

12. The process according to claim 1, wherein the one or more H-functional starter compounds are selected from at least one of the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, di- and trifunctional polyether polyols, wherein the polyether polyol is built up from a di- or tri-H-functional starter substance and propylene oxide or a di- or tri-H-functional starter substance, propylene oxide and ethylene oxide and the polyether polyols have a molecular weight $M_n$ in the range of from 62 to 4,500 g/mol and a functionality of from 2 to 3.

13. The process according to claim 1, wherein the DMC catalyst comprises at least one double cyanide compound selected from the group consisting of zinc hexacyanocobaltate(III), zinc hexacyanoiridate(III), zinc hexacyanoferrate (III), and cobalt(II) hexacyanocobaltate(III).

14. The process according to claim 1, wherein the DMC catalyst comprises at least one organic complexing ligand selected from the group consisting of aliphatic ethers, ethanol, isopropanol, n-butanol, iso-butanol, sec-butanol, tert-butanol, 2-methyl-3-buten-2-ol, 2-methyl-3-butyn-2-ol, ethylene glycol mono-tert-butyl ether, diethylene glycol mono-tert-butyl ether, tripropylene glycol monomethyl ether, and 3-methyl-3-oxetane-methanol.

15. The process according to claim 1, wherein the process is carried out in a tube reactor, a stirred tank or a loop reactor.

* * * * *